UNITED STATES PATENT OFFICE.

CHARLES EMMANUEL YVONNEAU, OF PARIS, FRANCE.

PREPARED CALCIUM CARBID.

SPECIFICATION forming part of Letters Patent No. 648,350, dated April 24, 1900.

Original application filed June 30, 1898, Serial No. 684,871. Divided and this application filed January 18, 1900. Serial No. 1,927. (No specimens.)

*To all whom it may concern:*

Be it known that I, CHARLES EMMANUEL YVONNEAU, a citizen of the French Republic, residing at 62 Rue Condorcet, Paris, France, have invented certain new and useful Improvements in Agglomerative Gas-Producing Bodies; and I do hereby declare the following to be a full, clear, and exact description of the invention, such as will enable others skilled in the art to which it appertains to make and use the same.

The present invention relates to a new article of manufacture, and has for its object to provide a superior gas-producing body of carbid of calcium having the general characteristics of the ordinary carbid—that is to say, which will develop acetylene gas in the presence of water or other aqueous liquid—this application being a division of original application, Serial No. 684,871, filed June 30, 1898. The new product is much handier in use than the ordinary commercial carbid and is, furthermore, superior, and herein lies one of its distinct features of novelty in that it is decomposed by the water in proportion only as the same penetrates into it. Another important feature of this carbid is that it ceases generating gas immediately it is removed from the water, which is attained by providing the carbid with a sheathing or protective coating, as hereinafter described.

A further object of the invention is to facilitate the use of the improved carbid for the various purposes to which it may be applied by manufacturing the same preferably in the form of prismatic and cylindrical bodies with a sheathing, as above referred to, whereby when exposed to the atmosphere the carbid is unaffected by a hygroscopic state of the same.

These and other features will be fully explained in the course of the following description.

This carbid is obtained in the following manner:

First. I heat in a receptacle of any preferred construction adapted to be heated by water-steam and provided with an agitator sixteen parts of glucose and four parts of a fatty body, such as any oil. I do not confine myself to any particular fatty substance or oil nor to the proportions herein stated, as the same are dependent on saccharine substance employed, the above-indicated proportions being used to obtain one hundred parts of the product. The bodies are then heated to 100° centigrade and thoroughly agitated, so as to form a perfectly-homogeneous mass substantially soluble in water.

Second. Ordinary calcium carbid is immersed in an oil to prevent its decomposition during the crushing operation and then broken in any suitable manner into fragments, and about eighty parts thereof are heated to a suitable temperature.

Third. The small fragments of carbid are introduced when hot into the mixture of glucose and oil mentioned under step 1, said mixture being kept boiling above 100° centigrade. The mixing produces a boiling up or effervescence of the substances which are gradually transformed into a mixture possessing a radically-different nature from said substances. This effervescence is not the result of the vapor contained in the glucose endeavoring to free themselves from the mass, which would be the natural supposition, because the glucose having been previously heated to 100° does not contain any watery vapors and may be considered perfectly free from water. Moreover, were there any watery vapors present in the mixture acetylene gas would be developed, which is not the case. When the mixture is perfectly homogeneous and while still hot—that is to say, in a plastic state—it can be molded into any suitable size and shape, according to the class of apparatus with which it is intended to be used—as, for instance, manufacturing or private gas-generating plants, acetylene-gas-generating lamps, and the like. The forms most preferred are solid prisms, cylinders, and the like. In manufacturing these bodies the amount of carbid compressed in each always corresponds to a certain unit of the production of gas which is desired. The sticks of carbid thus prepared are coated with a suitable hydrofuge, which when dry is impervious to moisture, and even if brought into contact with water will dissolve very slowly. The carbid cannot be attacked directly by the water, as it is similarly proof against water-vapors and a hygroscopic state of the atmosphere. Thus the carbid is rendered more durable. The decomposition of the carbid is so weak or retarded that it is practically odorless.

While the ordinary carbid cannot with facility be broken into pieces of the requisite size, the new product, on the contrary, offers no difficulty in this direction, as it can be prepared in blocks of any dimensions, as above stated, ready for immediate use.

The production of gas from the use of my carbid is very regular, and a noticeable feature is the absence of quick intermittent overproductions so frequent at present. The residuum is very slight, and thereby the use of cumbersome apparatus is avoided.

One of the principal advantages of the new carbid resides in the fact that after it has been removed from the water the generation of gas ceases immediately. This is very important.

Having now described my invention, I claim—

1. As a new article of manufacture, a gas-producing body composed of carbid of calcium crushed after having been saturated with a substance indecomposable by the carbid, combined with a hot liquid agglomerative mixture substantially soluble in water but indecomposable by the carbid and constituting a plastic mass from which the gas-producing body is molded, and having its exposed surface coated with a protecting medium slowly soluble in water, substantially as described.

2. As a new article of manufacture, a gas-producing body of any suitable shape, prepared, substantially as described, from carbid of calcium crushed after having been saturated in oil, combined in a hot state with a heated liquid agglomerative mixture of glucose and an oily substance, constituting a plastic mass from which the gas-producing body is molded, said body having its exposed surface coated with a protecting medium slowly soluble in water, as specified.

In testimony whereof I affix my signature in presence of two witnesses.

CHARLES EMMANUEL YVONNEAU.

Witnesses:
 CHARLES CABANIS,
 EDWARD P. MACLEAN.